Figure 1:
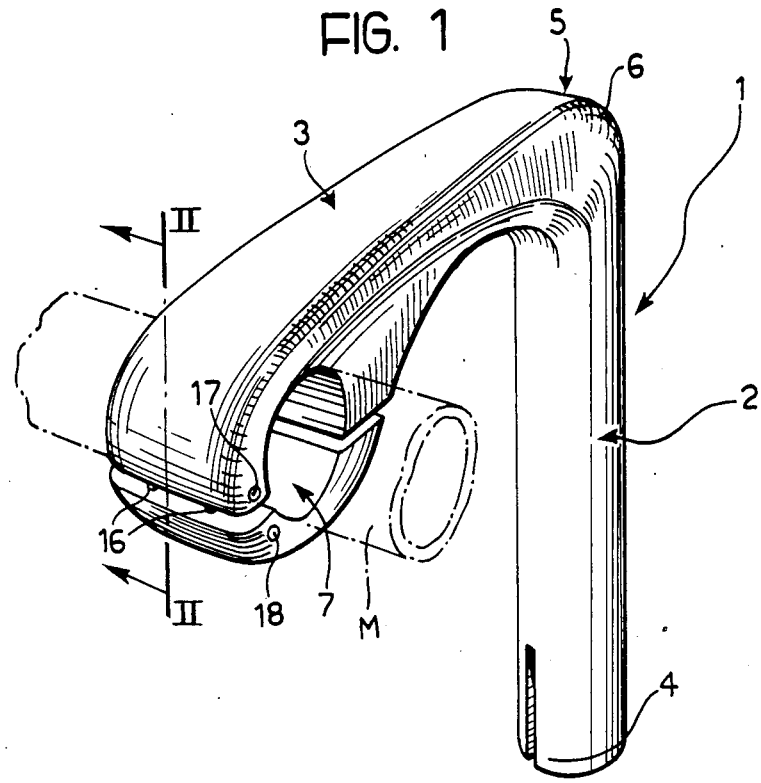

United States Patent [19]

Borromeo

[11] Patent Number: 4,794,815
[45] Date of Patent: Jan. 3, 1989

[54] ATTACHMENT DEVICE FOR ELEMENTS OF BICYCLE HANDLEBARS, WITH GRIPPING PARTS INCLUDING TWO JAW MEMBERS HINGED TOGETHER

[75] Inventor: Lucio Borromeo, Turin, Italy

[73] Assignee: 3T S.P.A., Turin, Italy

[21] Appl. No.: 29,563

[22] Filed: Mar. 24, 1987

[30] Foreign Application Priority Data

Mar. 24, 1986 [IT] Italy ............................ 53180/86[U]

[51] Int. Cl.$^4$ ...................... B62K 21/12; B62K 21/24
[52] U.S. Cl. .................................. 74/551.1; 74/551.8; 403/344
[58] Field of Search ............... 74/551.1, 551.8, 489, 74/488, 548, 551.3; 403/344, 53, 100, 102; 280/279, 280, 289 H

[56] References Cited

U.S. PATENT DOCUMENTS

| | | | |
|---|---|---|---|
| 636,133 | 10/1899 | Goodson | 280/279 |
| 711,443 | 10/1902 | Sharp | 74/489 |
| 745,928 | 12/1903 | Thron | 403/344 X |
| 1,023,419 | 4/1912 | Dewey | 403/344 |
| 1,391,727 | 9/1921 | Field | 403/344 |
| 3,391,582 | 7/1968 | Polley, Jr. | 74/551.1 |
| 4,221,497 | 9/1986 | Farrell | 403/344 |
| 4,348,916 | 9/1982 | Shimano | 74/489 |
| 4,603,887 | 8/1986 | Mayfield et al. | 403/344 X |

FOREIGN PATENT DOCUMENTS

| | | | |
|---|---|---|---|
| 200941 | 12/1958 | Austria | 74/551.1 |
| 2453771 | 11/1980 | France | 74/551.1 |
| 2513960 | 4/1983 | France | 280/279 |
| 2531026 | 2/1984 | France | 74/551.1 |
| 9603 | 4/1903 | United Kingdom | 74/551.2 |
| 1207338 | 11/1923 | United Kingdom | 74/489 |
| 423956 | 2/1935 | United Kingdom | 280/279 |

Primary Examiner—Richard E. Moore
Assistant Examiner—Rodney M. Lindsey
Attorney, Agent, or Firm—Sughrue, Mion, Zinn, Macpeak & Seas

[57] ABSTRACT

An attachment device for elements of bicycle handlebars includes a gripping part constituted essentially by two jaws together defining an aperture for receiving the handlebars. The jaws have respective first ends which face each other and are hinged together and respective second ends which also face each other and between which acts a clamping screw able to move the second ends together and consequently clamp the handlebar within the aperture. The respective first ends are substantially flat and have at least one auxiliary hinge member extending so as to connect the respective first ends.

2 Claims, 1 Drawing Sheet

U.S. Patent

Jan. 3, 1989

4,794,815

ATTACHMENT DEVICE FOR ELEMENTS OF BICYCLE HANDLEBARS, WITH GRIPPING PARTS INCLUDING TWO JAW MEMBERS HINGED TOGETHER

The present invention relates to attachment devices for elements of bicycle handlebars.

The device according to the invention has been developed with particular thought to two possible main uses, namely:

use as a handlebar support device comprising a support leg intended for insertion and clamping in the tube of the fork and having a gripping part which projects from the upper end of the leg and is provided with a transverse aperture for receiving the central portion of the handlebars, and use as an attachment member associated with each brake lever so as to allow the lever itself to be applied to a respective side of the handlebars.

In both the configurations of use envisaged, the device in question includes a handlebar gripping part provided with an aperture for receiving a respective portion of the handlebars themselves.

The device according to the invention is characterised in that:

the gripping part is constituted essentially by two jaw members together defining the aperture and having respective first ends which face each other and are hinged together and respective second ends which also face each other and between which act clamping means able to move the second ends together and consequently clamp the respective portion of the handlebars within the aperture, and the respective first ends are substantially flat and have at least one auxiliary hinge member extending so as to connect the respective first ends.

The practical advantages which can be achieved with the device according to the invention are related to two basic factors.

In the first place, the fact that the two jaw members constituting the attachment part of the device are hinged together considerably facilitates the assembly and removal of the handlebars.

More particularly, when the attachment device according to the invention is used for supporting the handlebars, it is possible to mount and remove the handlebars from the support without the need to remove at least one of the brake levers as well. This latter operation is absolutely necessary, however, with known types of supports having a through aperture for the handlebars defined by resiliently deformable members separated by a notch formed in the support. In this case, in fact, allowable variations in the dimensions of the through aperture are minimal and are such as not to allow the introduction and removal of the handlebars by a radial movement relative to the axis of the aperture, whereby handlebars can be inserted in and removed from the support only by longitudinal sliding in an axial direction relative to the aperture.

Secondly, the fact that the respective first facing ends of the jaw members are substantially flat (that is, substantially free from complementary shaped parts which interpenetrate in a generally hinged configuration), as well as facilitating the manufacture of the attachment device, also gives considerable constructional strength to the device itself, minimising the risk of breakage or damage during use by the end user.

Figure 2:
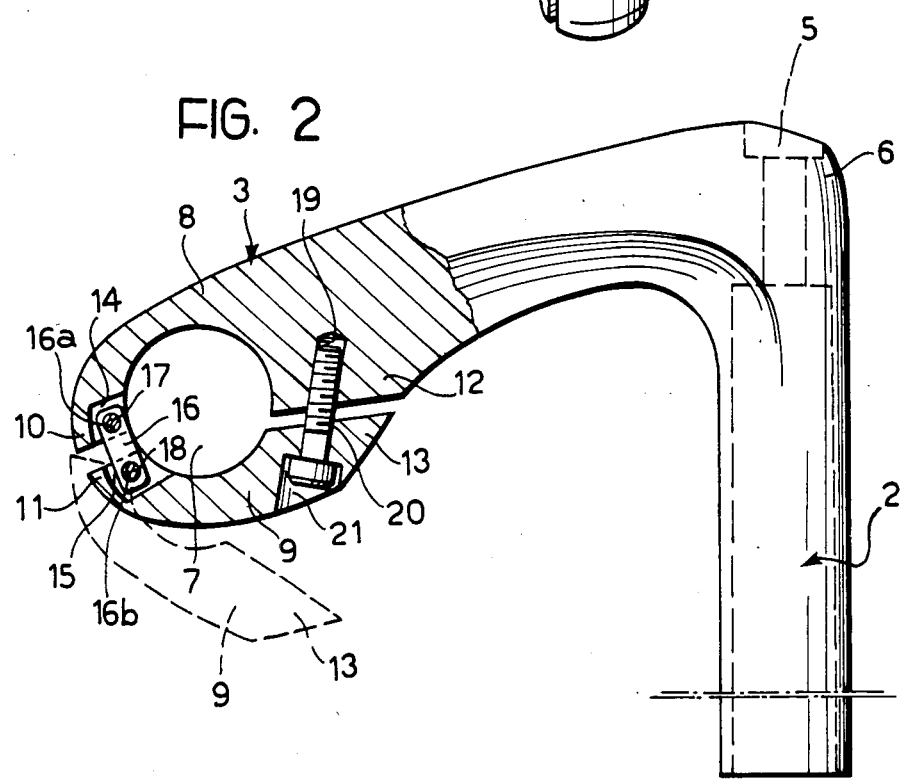

Further characteristics and advantages of the invention will become apparent from the description which follows, purely by way of non-limiting example, with reference to the appended drawings, in which:

FIG. 1 is a perspective view of a support for bicycle handlebars incorporating an attachment device according to the invention, and FIG. 2 is a sectional view taken on the line II—II of FIG. 1.

It must be stressed once more that, although the following description refers to the application of the device according to the invention to a support for the mounting of the handlebars on the fork of a bicycle, the device itself can also be used to advantage for the mounting of the brake levers on the handlebars themselves. Both cases, in fact, require the formation of a device including a handlebar gripping part which is provided with an aperture for receiving a respective portion of the handlebars. In the case of the support for the handlebars, this respective portion is constituted by the central portion of the handlebars. In the case of the application to brake levers, this respective portion is located adjacent one of the ends of the handlebars.

In FIG. 1 a support for bicycle handlebars is generally indicated 1. The supported is constituted essentially by a support leg 2 and a front part 3 for gripping the handlebars.

The leg 2 has a lower end 4 which can be expanded selectively, to effect the clamping of the fork (not illustrated) in the tube, by means of a screw (also not illustrated) inserted in a hole 5 at the upper end 6 of the support leg 2.

The front part 3 projects from the upper end 6 of the leg 2 and has a cylindrical aperture 7 at its front end (that is, at the end opposite the leg 2) for receiving within it the central portion (the profile of which is illustrated schematically in chain outline) of the handlebars M.

Thus, as best seen in the section of FIG. 2, the aperture 7 is defined by two jaw members 8 and 9, the first of which constitutes the top portion of the girpping part 3.

The jaw members 8 and 9 can be seen to include two first ends 10 and 11 which are substantially flat and face each other, and two second ends 12 and 13 which also face each other.

Each of the first ends 10, 11 has an outer surface and an inner surface facing the aperture 7.

At least one pair of vertically aligned recesses 14 and 15 is provided in this inner surface, in both the ends 10 and 11.

The recesses 14, 15 of each pair constitute a seat for a hinge member 16 constituted essentially by a plate element extending as a bridge between the opposite ends 10 and 11 of the jaw members 8 and 9.

More precisely, each hinge member 16 is provided with two end apertures 16a, 16b each of which is passed through by a respective pin 17 and 18 extending transversely within one of the ends 10 and 11 of the jaw members 8 and 9.

Preferably, as illustrated in FIG. 1, two hinge members 16 are provided, each mounted in a pair of recesses 14 and 15 and both traversed by the pins 17 and 18 which act as hinge pins.

The other end ("second" ends) 12 and 13 of the jaw members 8 and 9 have threaded holes 19 in which a screw 20, usually being of the hexagonal-socket type, is inserted so that it can be rotated by a tool through a hole 21 in the jaw member 9.

The arrangement described is such that:

loosening of the screw 20 until it is withdrawn from the portion of the hole 19 extending within the jaw member 8 allows the ends 12 and 13 to be separated from each other; the jaw member 9 can be pivoted about the hinge region in which the members 16 are mounted until it is brought into the open position illustrated in broken outline in FIG. 2; in this condition, the central portion M of the handlebars can easily be introduced into the aperture 7 without the need to remove at least one of the brake levers mounted on the handlebars;

the return of the jaw member 9 to the closed position illustrated in full outline in FIG. 2 and retightening of the screw 20 into the portion of the hole 19 in the jaw member 8 enables the handlebars to be clamped firmly to the support device 1, and the handlebars M may again be removed from the support 1—also without the need to remove at least one of the brake levers—by loosening of the screw 20 and then by the return of the jaw member 9 to its open position.

The fact that the hinge members 16 are mounted in facing recesses 14, 15 exclusively in the inner surfaces of the jaw members 8, 9—that is, the surfaces facing the aperture 7—means that these recesses are protected against dirt which could accidentally accumulate in the attachment device and prevent its opening.

Naturally, the scope of the present invention extends to models which enable equal utility to be achieved by means of the same innovative concept.

What is claimed is:

1. A handlebar gripping device comprising two opposed jaw members each having a substantially semi-cylindrical recess defining a substantially cylindrical aperture for receiving and gripping a tubular handlebar, said jaws having respective first substantially flat ends disposed in spaced apart, opposed relation to each other and respective second substantially flat ends disposed in spaced apart, opposed relation to each other, each of said first ends having at least one groove intersecting only said semi-cylindrical recess and said flat end, hinge means pivotally interconnecting said first ends, said hinge means being comprised of an elongated plate member having opposite ends disposed in said grooves and a pin pivotally connecting each of said opposite ends of said plate member to a respective first end of each jaw member, and clamping means engaging said second ends of said jaw members for drawing said second ends towards each other to clamp said jaw members on a tubular handlebar.

2. A handlebar gripping device as set forth in claim 1, further comprising an additional groove in each of said first ends identical to said at least one groove, an additional elongated plate member having opposite ends disposed in said additional grooves and additional pins pivotally connecting each of said opposite ends of said additional plate member to a respective first end of each jaw member.

* * * * *